United States Patent
Curry (10) Patent No.: US 8,166,011 B2
(45) Date of Patent: Apr. 24, 2012

(54) SYSTEM AND METHOD FOR ELECTRONICALLY MANAGING INDIVIDUAL AND BUSINESS INFORMATION

(75) Inventor: Scott S. Curry, Edina, MN (US)

(73) Assignee: Personalized Business Products, Inc., North Mankato, MN (US)

( * ) Notice: Subject to any disclaimer, the term of this patent is extended or adjusted under 35 U.S.C. 154(b) by 1657 days.

(21) Appl. No.: 11/242,603

(22) Filed: Oct. 3, 2005

(65) Prior Publication Data

US 2007/0094070 A1    Apr. 26, 2007

(51) Int. Cl.
*G06F 7/00* (2006.01)
*G06F 17/30* (2006.01)

(52) U.S. Cl. .................. 707/705; 358/1.15; 707/999.01
(58) Field of Classification Search ........... 358/1.1–1.16
See application file for complete search history.

(56) References Cited

U.S. PATENT DOCUMENTS

| | | | |
|---|---|---|---|
| 5,732,229 A | 3/1998 | Dickinson | |
| 5,804,803 A | 9/1998 | Cragun et al. | |
| 5,978,773 A | 11/1999 | Hudetz et al. | |
| 6,085,242 A * | 7/2000 | Chandra | 709/223 |
| 6,374,259 B1 | 4/2002 | Celik | |
| 6,533,171 B1 | 3/2003 | Porter | |
| 6,633,311 B1 | 10/2003 | Douvikas et al. | |
| 6,650,761 B1 | 11/2003 | Rodriguez et al. | |
| 6,654,768 B2 | 11/2003 | Celik | |
| 6,691,158 B1 | 2/2004 | Douvikas et al. | |
| 6,722,574 B2 | 4/2004 | Skantze et al. | |
| 6,758,391 B1 | 7/2004 | Pickens, III | |
| 6,783,060 B2 | 8/2004 | Marappan | |
| 6,883,000 B1 | 4/2005 | Gropper | |
| 6,889,213 B1 | 5/2005 | Douvikas et al. | |
| 2002/0138470 A1 | 9/2002 | Zhou | |
| 2002/0138633 A1 | 9/2002 | Angwin et al. | |
| 2004/0051730 A1 | 3/2004 | Douvikas et al. | |
| 2004/0073869 A1 | 4/2004 | Douvikas et al. | |
| 2004/0088259 A1 | 5/2004 | Celik | |
| 2004/0093317 A1 | 5/2004 | Swan | |
| 2004/0111360 A1 | 6/2004 | Albanese | |
| 2006/0293904 A1 * | 12/2006 | Ramanathan et al. | 705/1 |
| 2007/0028166 A1 * | 2/2007 | Hundhausen et al. | 715/530 |

FOREIGN PATENT DOCUMENTS

| | | |
|---|---|---|
| GB | 2242162 | 9/1991 |
| WO | WO-01/10653 | 2/2001 |

OTHER PUBLICATIONS https://ecardfile.com, what's new with ecardfile.com? (Jul. 13, 2005).

* cited by examiner

*Primary Examiner* — Benny Tieu
*Assistant Examiner* — Michael Tzeng
(74) *Attorney, Agent, or Firm* — Patterson Thuente Christensen Pedersen, P.A.

(57) ABSTRACT

Systems and methods for electronically managing individual and business information. The systems and methods encompass three printing stages of pre-printing, printing, and post-printing. In one embodiment, the invention provides contact information by a printer, the contact information derived from a single raw data set provided to a printer to obtain a printed contact information carrier and converted by the printer into at least one alternate format during customary creation of the printed contact information carrier. A printed information carrier including an entity-specific digital information locator is also disclosed.

42 Claims, 5 Drawing Sheets

SYSTEM AND METHOD FOR ELECTRONICALLY MANAGING INDIVIDUAL AND BUSINESS INFORMATION

FIELD OF THE INVENTION

The present invention relates generally to information management. More particularly, the present invention relates to a system for managing information in a printing system by creating a hardcopy information carrier and providing access to the information on the carrier in a variety of formats.

BACKGROUND OF THE INVENTION

Prior to printing business cards, invitations, envelopes, and other customized printed materials and objects, printers receive customization information and manually create an information file from which to print. For example, when printing business cards, a customer can first provide the printer with contact information, logo(s), and additional customization information or instructions. A typesetter then enters and formats the information and logo(s) to create a digital file of the business card. The digital file can include raw information, specially formatted information, or a digital representation of the business card. Although somewhat uncommon, customers may directly provide a digital file of the business card to the printer, possibly eliminating the need to manually enter the information into the printer's computer system.

The digital file can be saved and used to print a plurality of cards, invitations, envelope, or other objects with the customization information. The digital file is therefore also available at a later date when additional printed objects are ordered. In some instances, the digital file may be transferred to or owned by the customer for their own printing needs.

Upon receipt of the printed business cards, the customer can distribute the cards to a variety of recipients. A recipient can then file the business card in a physical file system or transfer the information to an electronic address book or contact system. Typically, a business card recipient will manually enter the information into an electronic program, such as Microsoft Outlook or IBM Lotus Notes, to save the information. In one example, a digital vCard (.VCF) file can be created, containing the contact and other information usually found on a paper business card. The .VCF file can be distributed to other parties in an electronic form, such as by posting on a computer network or by sending the .VCF file as an attachment in an e-mail message. The other parties can then download the information contained in the .VCF file in a variety of information management systems, such as Microsoft Outlook or IBM Lotus Notes, for example. Electronic .VCF files, however, still require manual entry to be created. Manual entry can be time-consuming and may introduce errors into the information that is entered.

There are a number of commercially available business card scanners that can convert the information on hardcopy business cards into an electronic form, such as an electronic image or .VCF file. However, this process also requires time, as the cards must be manually placed into the scanner. In addition, these scanners are generally designed for business cards and are not adapted for processing invitations, envelopes, or other types of printed materials. Further, the image quality provided by optical scanning systems is generally not as high as desired.

Electronic business information may also be available in web-based databases. For example, U.S. Pat. No. 6,691,158 discloses an accessible electronic service and method for organizing contact information entered by members. The member can enter their contact information and other parties with access to a website containing the information can access and download the contact information to their computer.

U.S. Pat. No. 6,654,768 discloses an information management tool that enables a user to enter an identification number to access contact information of another user in an internet-accessible database. The user identification can be printed on a business card and distributed to other parties.

PCT Publication No. WO 01/10653 discloses a business card arranged to enable access to a computer network for retrieving information that is associated with the business card. It may be done automatically, by a chip on the card, or manually by entering a Uniform Resource Locator (URL). Users can download the information to their computer. PCT Publication No. WO 02/25403 is directed to a method of automatically updating contact information. A publisher updates the information in the database. The service subscribers associated with the publisher receive new information as it is updated.

U.S. Pat. No. 6,883,000 discloses a system in which a Universal Contact Locator (UCL) is encoded onto a business card, the UCL is entered into a client program, and the program can access a database with contact information, news, and advertising that is associated with the client. The information can then be exported to the client's computer.

U.S. Patent Publication No. 2004/0093317 discloses a system for controlling, distributing and receiving contact information including a central hub. The hub maintains the information and transmits the requested information to a requesting terminal means.

The presently available systems and methods are generally limited to providing access to a remote database containing an electronic version of an individual or business's contact and other information and provide little or no connection to hardcopy, printed business cards and other printed information media. Conventional printed business card designs, however, have inherent deficiencies in information management without manual information transfer and management. To protect the accuracy and integrity of the information, manual transfers should be reduced or eliminated.

Further, an opportunity exists to expand the process of printing business cards and other objects to create an information management system. Accordingly, there is a need for a system to integrate and manage information from a pre-printing stage to a post-printing stage of business card and other printed object creation.

SUMMARY OF THE INVENTION

The present invention substantially addresses the aforementioned needs by providing systems and methods for electronically managing individual and business entity information. The invention also includes a printed information carrier.

In one embodiment, a system for managing information according to the invention comprises a high resolution digital image file, a low resolution digital image file, and a digital information file. The high resolution digital image file can be used to create an information carrier, the low resolution digital image file can be displayed on a network, and the digital information file can be transferred across a network. The system further comprises a database coupled to the network and adapted to store the high and low resolution digital image files and the digital information file, a computer device coupled to the network and operable to create the high and low resolution digital image files and the digital information file from raw information and to upload the high and low resolution digital image files and the digital information file to the database, and an information carrier comprising a digital information locator, the locator comprising a location on the network at which the low resolution digital image file can be displayed and from which the digital information file can be transferred.

In another embodiment, a method of managing information according to the invention comprises receiving raw information. The raw information is converted into a high resolution digital image file, a low resolution digital image file, and a digital information file. The high and low resolution digital image files and the digital information file are stored on a network-accessible device, and an information carrier is selectively created from the high resolution digital image file, the information carrier comprising a digital information locator. Access to the low resolution digital image file and the digital information file on the network-accessible device can then be provided through the digital information locator.

In yet another embodiment, a method of providing information management tools according to the invention comprises receiving raw contact information for printing on an information carrier, and entering the raw contact information into a computer for use by a printing system. At least one digital file can then be selectively created from the raw contact information and stored in a network accessible location. The printing system can then print an information carrier (such as a business card). The information carrier can include a printed network address related to the network accessible location, and directions to accomplish selective access to the at least one digital file at the network accessible location can thereby be provided.

In another embodiment, the invention is directed to a method of providing contact information by a printer, the contact information derived from a single raw data set provided to a printer to obtain a printed contact information carrier and converted by the printer into at least one alternate format during customary creation of the printed contact information carrier. The printer receives a raw data set comprising entity contact information and inputs the raw data set into a printing system. The raw data set is converted into a first data format to create a printed contact information carrier comprising the entity contact information, and the carrier is printed according to the first data format to provide the entity contact information in a hardcopy form. At least one alternate digital data format comprising the entity contact information can then be generated from the previously input raw data set, without additional inputting of the raw data set, and provided to supplement distribution of the carrier, wherein the carrier is printed to include a network address to access the at least one alternate digital data format.

The invention is also directed to a printed information carrier customized for an entity. In one embodiment, the printed information carrier comprises contact information of the entity, the contact information comprising identity information, location information, voice contact information, and data contact information, and an entity-specific digital information locator. The locator can provide access in at least one digital form to the contact information of the entity as provided on the printed information carrier, a first digital visual form and a second downloadable digital data form.

The above summary of the invention is not intended to describe each illustrated embodiment or every implementation of the present invention. The figures and the detailed description that follow more particularly exemplify these embodiments.

DETAILED DESCRIPTION OF THE DRAWINGS

Figure 1:
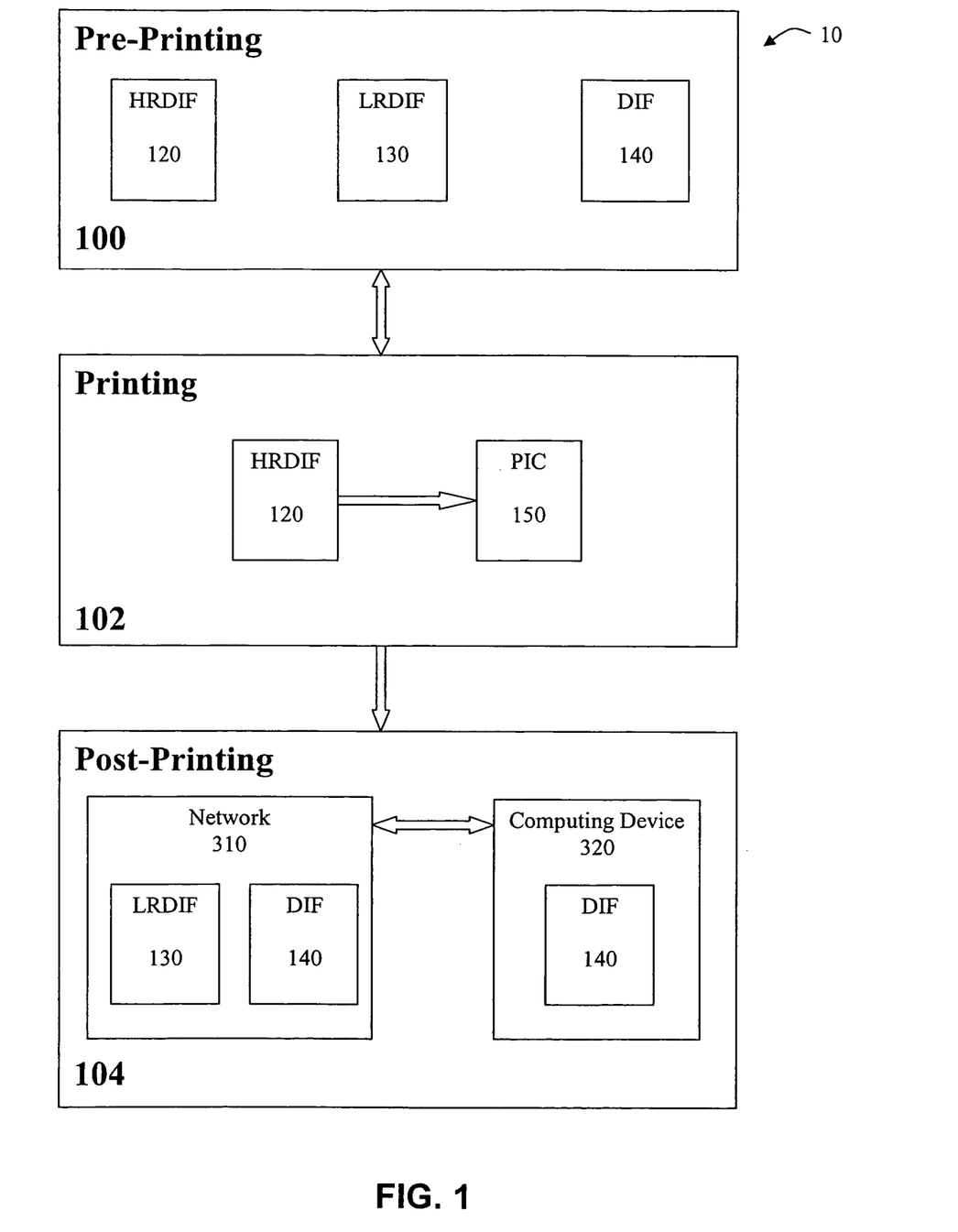
FIG. 1 is a block diagram of a system according to one embodiment of the invention.
Figure 2:
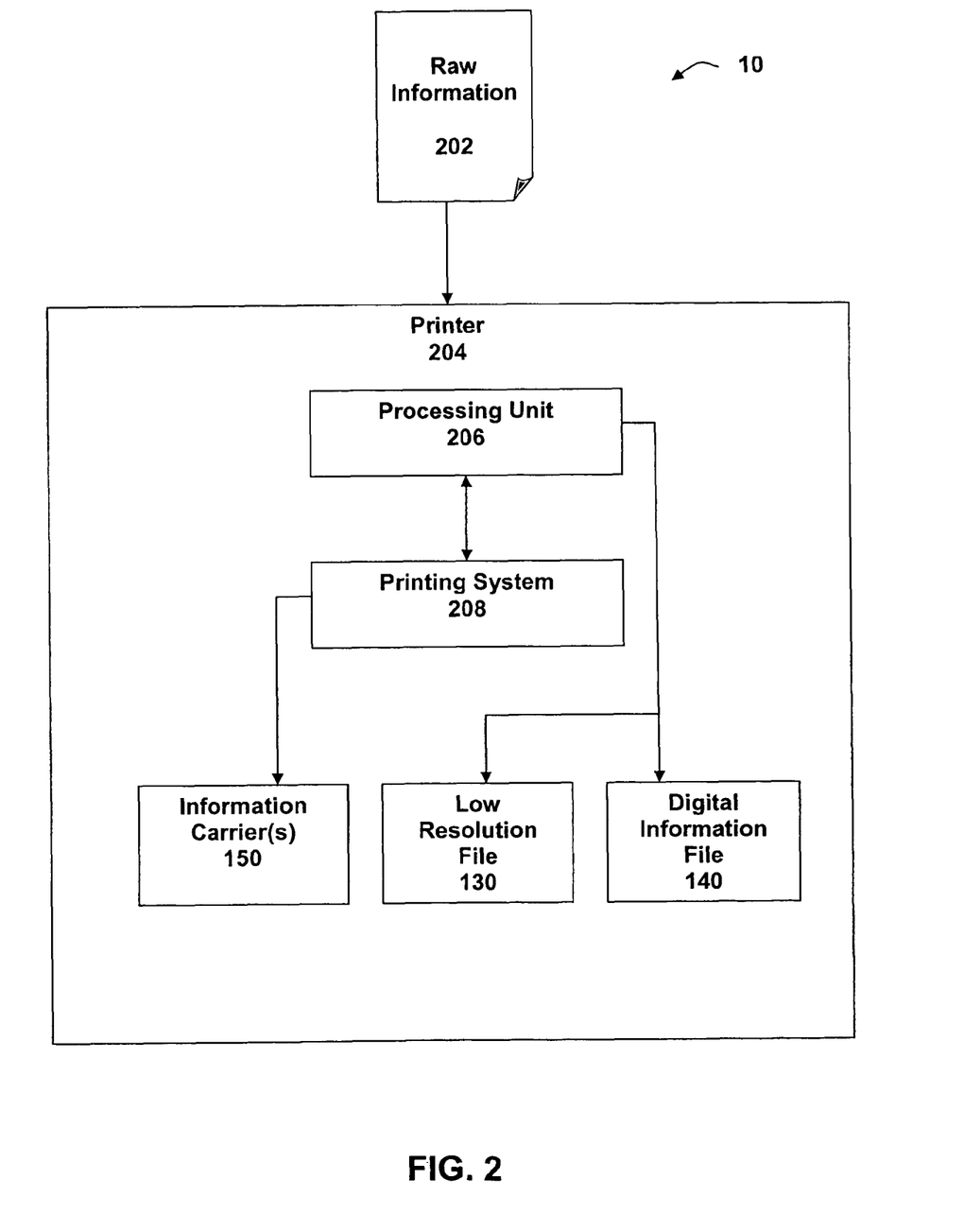
FIG. 2 is a block diagram of a system according to one embodiment of the invention.

One embodiment of a system 10 of managing information generally found on an information carrier according to the present invention is shown in FIGS. 1 and 2. An information carrier may be a business card, post card, greeting card, invitations, announcements, advertisements, envelope, letterhead, folder, or other printed paper product, or a cup, coffee mug, article of clothing, bag, or virtually any other specialty printed item or article.

System 10 generally comprises three stages: a pre-printing stage 100, a printing stage 102, and a post-printing stage 104. Each stage is described in more detail below with reference to FIGS. 1 and 2.

In pre-printing stage 100, raw information 202 related to the creation and customization of an information carrier is received by a printer 204, such as a commercial printing company or organization. Information 202 can comprise contact information, including a name, address, telephone and facsimile numbers, e-mail address, uniform resource locator (URL) or network address, and the like, business and service information, logos, photos, designs, digital image files, and other such information. Information 202 is supplied to printer 204 by a customer and can be in any variety of formats, including hardcopy, written or printed; oral, such as in a voicemail message; or digital, such as in a PDF, JPEG, GIF, TIF, PNG, VCF, word processing, spreadsheet, or other suitable digital file formats, or in an e-mail message.

Printer 204 transfers information 202 into a printing system 208. Although it may be transferred in virtually any practical manner, information 202 is generally transferred manually by a typesetter, who types or copies information 202 or files into a processing unit 206, such as a computer or terminal, coupled to or integrated with printing system 208. If information 202 is provided in a digital format, the digital file or information can be uploaded directly to processing unit 206.

Processing unit 206 then comprises a central point from which to facilitate creation and dispersion of a plurality of products, articles, and files from the raw data received as information 202. With the increasing shift from paper to digital information management and transactions, it is desirable to have electronic access and the ability to electronically upload, distribute, and download information commonly found on information carriers 150, such as a business card. Known software programs can manage and organize electronic information commonly found on information carriers 150 as electronic business cards or information databases. Previous systems and programs typically require a user to manually upload the information into the software, provide information to printer 204 for the printing of hardcopy information carriers, system 10 of the invention provides increased information dissemination options, including electronic and digital options, in an efficient manner and with minimal backend system changes.

For printing information carrier(s) 150 in printing stage 102, processing unit 206 creates a high resolution digital image file (HRDIF) 120 from the uploaded information in pre-printing stage 100. Processing unit 206 can include a suitable design software program capable of generating high resolution image file 120 from information 202, reflecting the desired design to be printed on information carrier 150.

High resolution file 120 can comprise a variety of file formats, such as PDF, JPEG, GIF, TIF, PNG, VCF, word processing, spreadsheet, or other suitable digital file formats. In one preferred embodiment, high resolution file 120 comprises a PDF file for printing at least about 300 dots per inch (DPI), more preferably about 600 DPI or greater. High resolution file 120 can be used for additional printing tasks or other purposes for which high image quality is desired and in which large file size is not an impediment.

From information 202 already received and vetted by printer 204 and transferred to processing unit 206 for the creation of information carrier 150 via high resolution file 120, processing unit 206 optionally creates a low resolution digital image file (LRDIF) 130 and/or a digital information file (DIF) 140 in addition to high resolution file 120 in pre-printing stage 100. Files 130 and 140 can be used to electronically distribute information 202 to supplement or enhance information 202 printed on and distributed by information carrier 150. Low resolution file 130 can be used in a variety of applications and is preferred for digital dissemination of information as compared to high resolution file 120 because of lower storage demands, easier digital dissemination, and faster transfer speeds. One or more software programs operating on processing unit 206 create low resolution file 130 and digital image file 140 in one embodiment.

Low resolution file 130 and digital image file 140 can be manually or automatically created, and manually or automatically uploaded and stored in a database 210, during pre-printing stage 100. Database 210 may be geographically local to or remote from processing unit 206 and is locally and/or widely networked in one embodiment. For example, database 210 can be communicatively coupled to a corporate intranet system, to the Internet, or to some other computer or information network.

In one embodiment of system 10, low resolution file 130 comprises a PDF, JPEG, GIF, TIF, PNG, VCF, word processing, spreadsheet, or other suitable digital file formats. Digital information file 140 comprises a vCard (.VCF) file, an electronic business card file, or another file format suitable for efficiently transferring contact and other information digitally. Other compatible file formats can also be used instead of or in addition to the aforementioned file formats.

After the creation of high resolution file 120 and the optional creation of one or both of low resolution file 130 and digital information file 140, high resolution file 120 is used by printing system 208 in a printing process in printing stage 102. Processing unit 206 is operably connected to printing system 208. The printing process can be any printing process using any printing technique, such as inkjet, offset, laser, intaglio, embossing, and other suitable printing methodologies and techniques. In printing stage 102, printing system 208 utilizes high resolution digital image file 120 to print the file information on a substrate or article comprising paper, cardboard, cardstock, plastic, foil, fabric, ceramic, glass, or some other suitable substrate. The substrate or article is optionally post-processed. For paper products, the substrate may be converted by cutting and sometimes folding into shapes and sizes characteristic of information carriers 150, such as business cards, greeting cards, postcards, invitations, and the like. Other articles may require laminating, heat treatment, glazing, stamping, gluing, cutting, stitching, and other processing.

Figure 3:
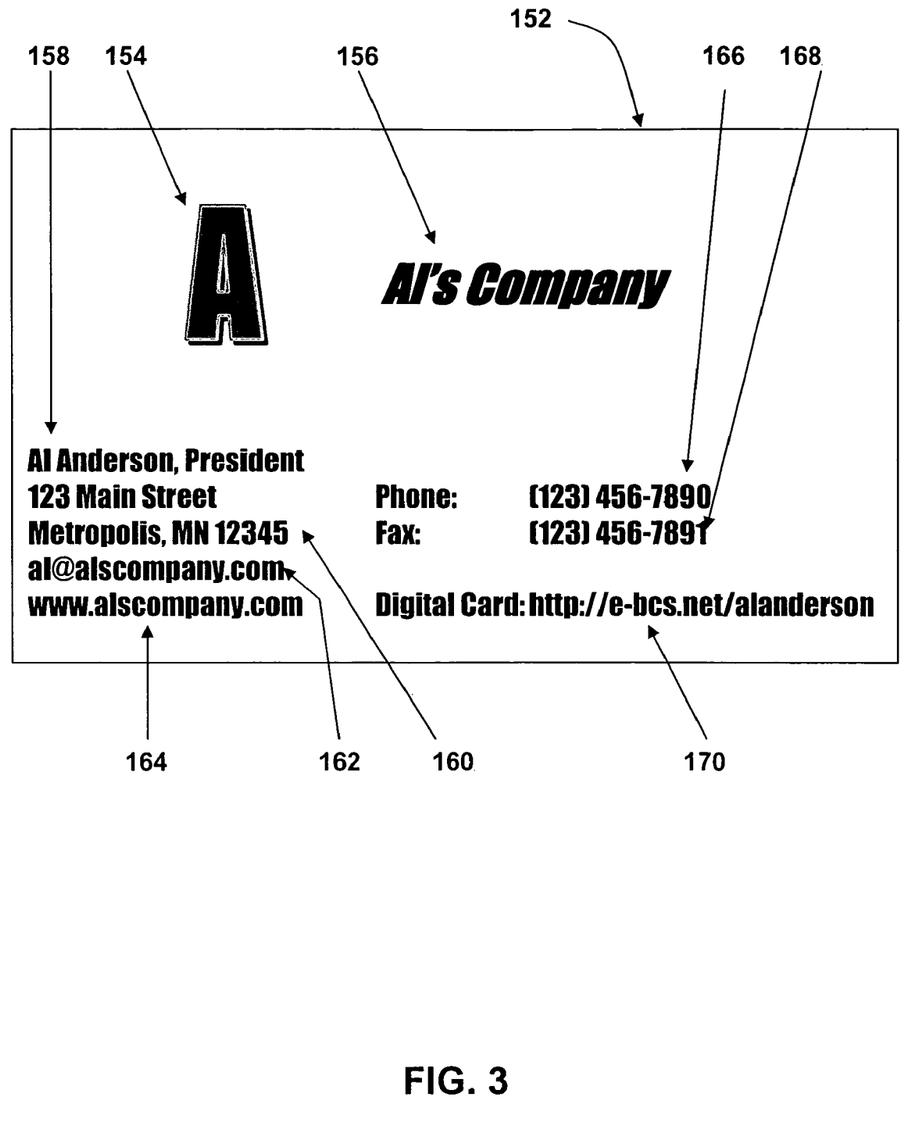
FIG. 3 is a diagram of an information carrier according to one embodiment of the invention.

In one embodiment of the invention, information carrier 150 comprises a business card. An example business card information carrier 151 is shown in FIG. 3. Card 152 can be printed from high resolution file 120 in printing stage 102 as described above. In one embodiment, card 152 comprises a logo 154, company identification information 156, cardholder identity 158, a cardholder postal mailing address 160, an electronic mail address 162, a company Internet address 164, a cardholder telephone number 166, and a cardholder facsimile number 168. Card 152 can optionally include additional information or exclude information depicted in FIG. 3. As depicted, card 152 further comprises a digital card locator 170. Digital card locator 170 can comprise other types and formats, but in FIG. 3, digital card locator 170 comprises a customized network address printed on information carrier 150. The address can be user-selectable or can be assigned at random or according to some formula, such as based upon a user's name or e-mail address. Locator 170 can be human-readable, such as printed text, or machine-readable, such as an encrypted or unencrypted bar code, radio frequency identification (RFID) device, computer chip, and the like. Locator 170 can also be located on either the front or back of card 152, or may be embedded within card 152, as may be convenient for a machine-readable chip. In an embedded or machine-readable embodiment, card 152 may optionally also include a human-readable prompt or indicator to alert a recipient to the presence of the locator 170. The address is preferably a network address, for example a URL address, but may alternatively or additionally comprise other address or location information. The address of locator 170 can be customized for cardholder 158, company 156, or some other criteria.

In one preferred embodiment, digital card locator 170 includes a location at which a recipient of card 152 can interface with low resolution file 130 and digital information file 140. Upon completion of the printing of information carrier 150, in this example card 152, the cardholder selectively disseminates card 152 to at least one recipient, such as a client, customer, business, contact, friend, family member, coworker, and the like in post-printing stage 104. The third party then has access to the information printed on or optionally embedded within card 152, including digital card locator 170. In an alternative embodiment, a password and/or an access ID is provided on information carrier 150 or by the information owner.

The recipient may then go to the address or other location information of digital card locator 170 located on information carrier 150. For example, if digital card locator 170 comprises a URL address, the recipient can manually enter the URL into an Internet browser or program on a computer device 320. Computer device 320 can be a personal desktop or laptop computer, a personal digital assistant, a computer organizer, a cell phone, or some other computer device. In a machine-readable embodiment, the recipient may scan or read card 152 using an appropriate device. The URL may first direct the recipient to a general login page. If the third party is directed to a general login page, an access code or password may be required to access the information supplier's information.

Figure 4:
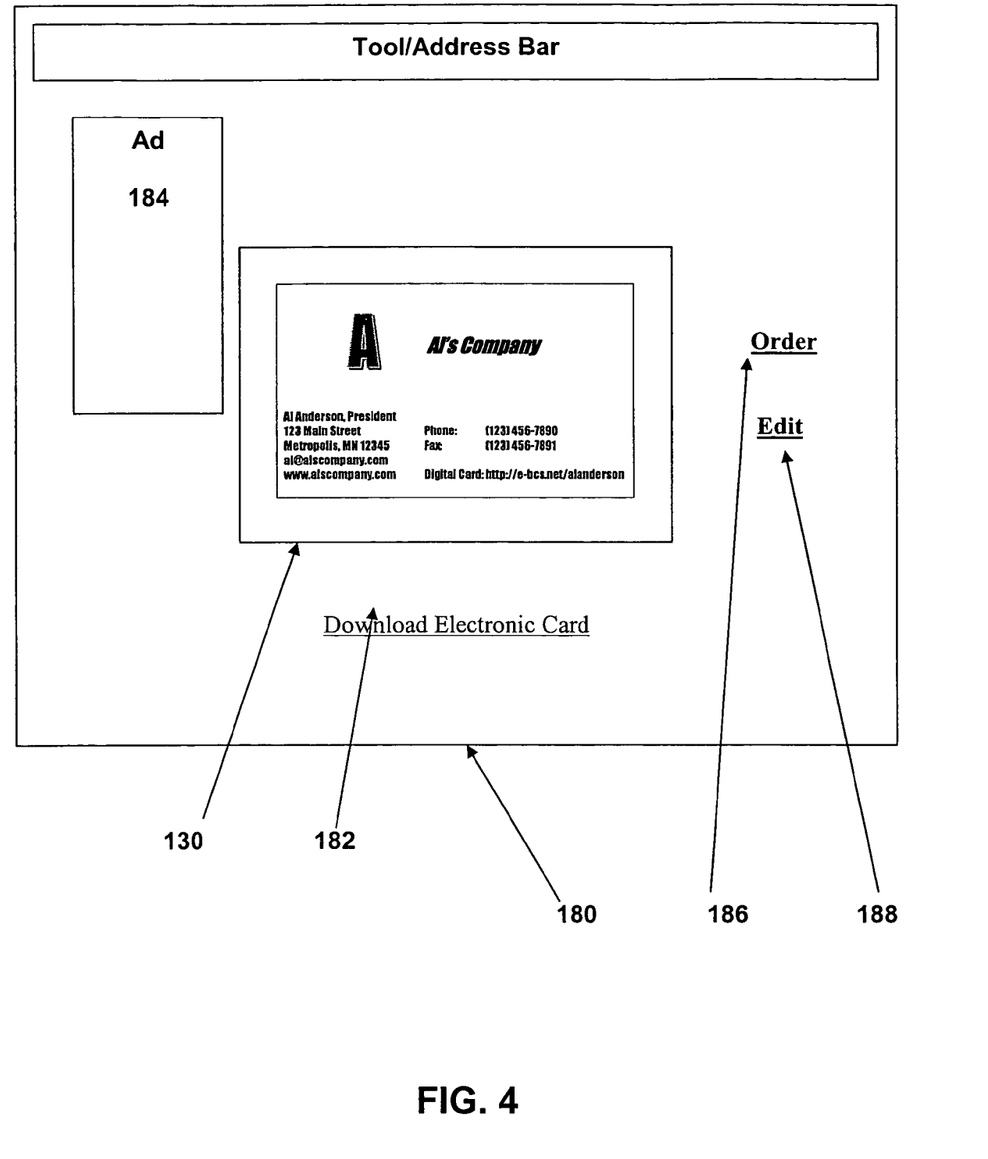
FIG. 4 is a diagram of an interface according to one embodiment of the invention.

In a preferred embodiment, the URL takes the recipient directly to the cardholder's information. Referring to FIG. 4, a viewing interface 180 generally comprises a screen, display, or graphical user interface (GUI) associated with computer device 320. Interface 180 graphically displays information 202 associated with the cardholder of card 152 by displaying low resolution image file 130. Low resolution file 130 can include a digital reproduction of card 152, a textual representation of information 202 or card 152, or some other format, as created in pre-printing stage 100. As depicted in this example, low resolution file comprises a low resolution (as compared to high resolution file 120) representation of card 152.

In one embodiment, interface 180 is part of or in communication with a computer system of printer 204, including database 210. The computer system that hosts or provides interface 180 can optionally be maintained by a third-party vendor other than printer 204.

Interface 180 can further comprise a link 182 by which the recipient can selectively download the information printed on card 152 and displayed by low resolution file 130 from database 210 to a suitable information management program, such as Microsoft Outlook or IBM Lotus Notes, or to a compatible electronic address book or list. The information available for download and selectable by link 182 preferably comprises digital information file 140 in one embodiment. Alternatively, the information comprises low resolution file 130 or some other file format.

Interface optionally includes other information, such as one or more advertisements 184, an order link 186, and an edit link 188. Order link 186 enables a cardholder to quickly and easily order additional cards 152 or to order other information carriers 150 that include information 202. For example, a cardholder may initially order business cards and later decide to order letterhead and envelopes to match. Order link 186 may also be used by a recipient to order his or her own information carriers upon viewing a cardholder's information. Link 186 can provide a direct link to printer 204, in one embodiment to an automated order or inquiry form. If a cardholder rather than a recipient accesses interface 180, he or she may edit or update their information directly by selecting edit link. In another embodiment, interface 180 can be integrated into pre-printing stage 100 such that a cardholder can view a "proof" of an information carrier 150 prior to printing to confirm the information and comment on formatting or layout.

A recipient viewing interface 180 can also optionally provide contact information, such as an e-mail address. With a cardholder's permission, printer 204 can then e-mail revised or updated cardholder information if received at a later date. With a recipient's permission, printer 204 can contact the recipient directly with offers or other correspondence. In a related embodiment, a cardholder can access interface 180 for data mining purposes, such as to see a number of times his or her information has been viewed or downloaded. This can be helpful as a reorder prompt; if the cardholder ordered 500 information carriers 150 and their corresponding digital information file 140 has been downloaded 300 times, the cardholder may recognize an increased need for the information and could decide to order additional information carriers 150.

In one embodiment of the invention, information 202 provided to printer 204 comprises multiple data sets. For example, a corporate client may provide information for all of its employees, or a subset, such as all salespersons. System 10 of the invention can manage large data sets as well as individual data sets and can provide wide proofing or editing access to a corporate administrator, for example, via interface 180 while restricting editing access to employees to permit only the updating of basic contact information. In another example, a customer can supply a family or holiday card list as information 202 and printer 204 can provide customized and differentiated information carriers 150. In the case of a holiday card list, information carriers could include a set of identical cards with individually printed addressed envelopes. The customer could then add to or otherwise manage the list throughout the year via interface 180.

Figure 5:
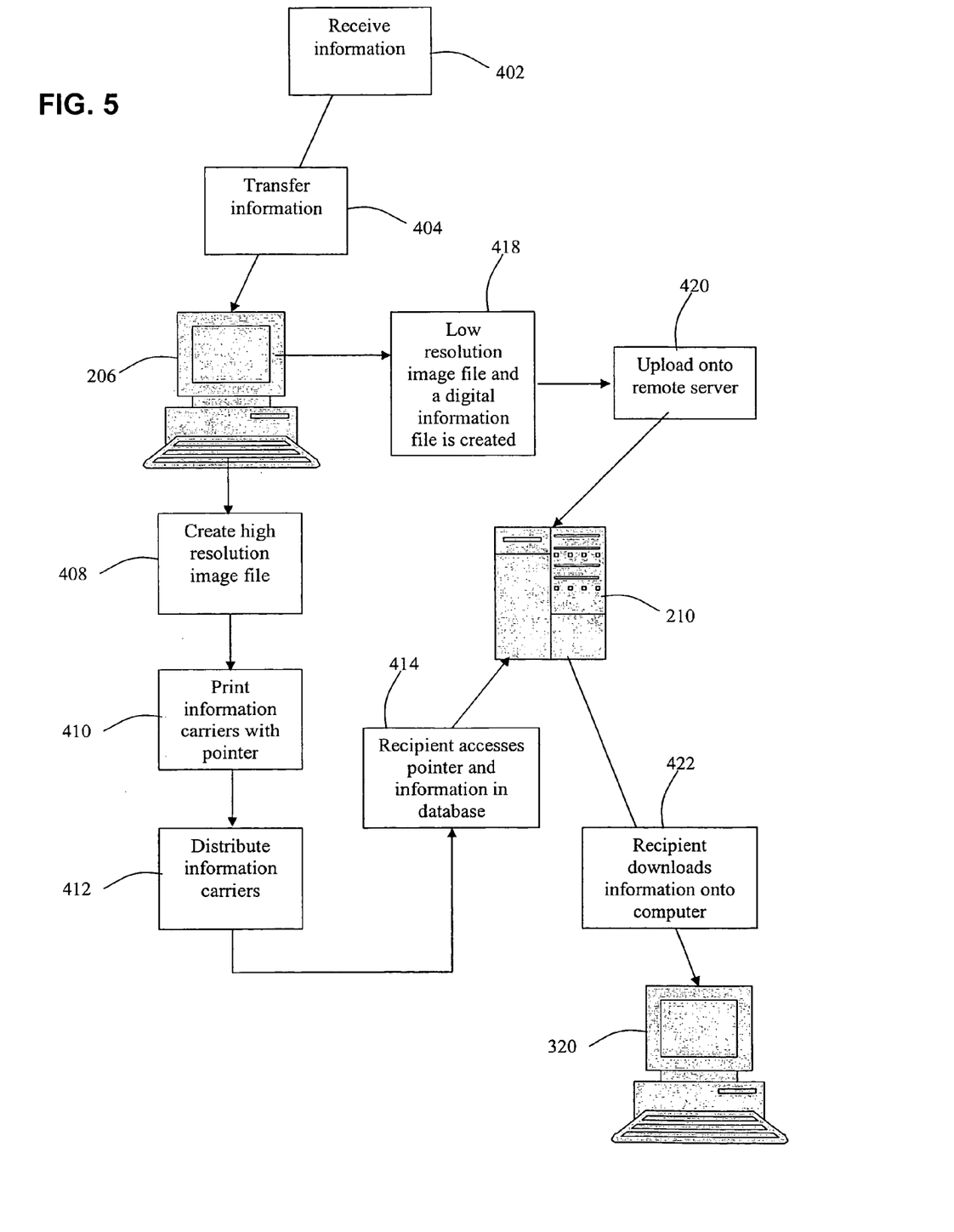
FIG. 5 is a flowchart of one embodiment of a system according to the invention.

FIG. 5 is a flowchart of a method according to one embodiment of the invention, in view of the description above and FIGS. 1-4. At step 402, information 202 is received by printer 204 from a customer. Information 202 is transferred to a computer system (206) at step 404. Referring also to printing stage 102, a high resolution digital image file 120 is created at step 408 and information carriers 150 are printed at step 410. Referring also to post-printing stage 104 of FIG. 1, information carriers 150 can then be distributed to recipients at step 412.

Returning to printing stage 100 of FIG. 1, low resolution image file 130 and digital information file 140 are optionally created at step 418. As previously mentioned, low resolution file 130 and digital information file 140 are optionally created by processing unit 206 in pre-printing stage 100. In one embodiment, files 130 and 140 may be created automatically by printer 204, to be complimentarily provided to a customer with purchased information carriers 150. In one embodiment of the invention, a customer can pay a service or subscription fee, such as an annual or per-view/download fee, to maintain current information in files 130 and 140 available for viewing and downloading, respectively. In other embodiments, this cost is built in to the cost of information carriers 150 or is provided free of charge.

Files 130 and 140 can be customer-selected upon ordering information carriers 150 for an additional charge or at no cost, as printer 204's discretion, or can be automatically provided as a business service enhancement by printer 204. Files 130 and 140 are uploaded to database 210 at step 420. At step 414, a recipient may access information, such as low resolution digital image file 130 and/or digital image file 140, in database 210. The recipient may then optionally and selectively download digital image file 140 onto a computer device 320 (referring also to FIG. 1) at step 422.

The present invention therefore includes an information management system that efficiently and effectively manages and organizes information from a pre-printing stage, including creation of image and electronic business card files, through post-printing stages including the accessibility of the information to a variety of individuals and organizations. The invention further includes methods of managing information. The present invention may be embodied in other specific forms without departing from the central attributes thereof, therefore, the illustrated embodiments should be considered in all respects as illustrative and not restrictive, reference being made to the appended claims rather than the foregoing description to indicate the scope of the invention.

What is claimed is:

1. A method of providing contact information, the method comprising:

receiving, by a network device, a raw data set comprising entity contact information;

transferring the raw data set into a printing system and converting the raw data set into a high resolution digital data format file to create a printed business card comprising the entity contact information;

storing the high resolution digital data format file in a database communicatively coupled to the printing system;

printing the business card according to the high resolution digital data format file to provide the entity contact information in a hardcopy form;

generating a low resolution digital data format file and an electronic business card file each comprising the entity contact information from the previously input raw data set as printed on the business card, without additional inputting of the raw data set, the low resolution digital data format file having a smaller file size than a file size of the high resolution digital data format file;

storing the low resolution digital data format file in the database; and providing at least one of the low resolution digital data format file or the electronic business card file to supplement distribution of the business card, wherein printing the business card further comprises printing a network address on the business card to access at least one of the low resolution digital data format file or the electronic business card file.

2. The method of claim 1, wherein providing at least one of the low resolution digital data format file or the electronic business card file comprises providing access to the electronic business card file to download the entity contact information.

3. The method of claim 2, wherein generating a low resolution digital data format file and an electronic business card file each further comprises generating a digital visual representation of the business card from the low resolution digital data format file, and wherein providing at least one of the low resolution digital data format file or the electronic business card file comprises providing visual access to the digital visual representation of the business card via a network interface.

4. The method of claim 1, wherein generating an electronic business card file comprises generating a VCF file.

5. The method of claim 1, wherein printing the business card further comprises printing an entity-specific network address on the business card.

6. The method of claim 5, wherein the network address comprises a uniform resource locator (URL).

7. A system for managing information, comprising:
a high resolution digital image file for use in creating an information carrier;
a low resolution digital image file for display on a network, the low resolution digital image file having a faster transfer speed than the high resolution digital image file;
a digital information file for transfer across the network, the digital information file having a faster transfer speed than the low resolution digital image file;
a database coupled to the network and adapted to store the high and low resolution digital image files and the digital information file;
a computer device coupled to the network and operable to create the high and low resolution digital image files and the digital information file from raw information and to upload the high and low resolution digital image files and the digital information file to the database; and
an information carrier created from the high resolution digital image file and comprising a digital information locator, the locator comprising a location on the network at which the low resolution digital image file is displayed and from which the digital information file is transferable.

8. The system of claim 7, wherein the digital information file comprises an electronic business card file.

9. The system of claim 8, wherein the electronic business card file comprises a VCF file.

10. The system of claim 7, wherein the low resolution digital image file comprises a digital image representation of the information carrier.

11. The system of claim 7, further comprising a printing system coupled to the computer device and operable to create the information carrier by printing the information carrier from the high resolution digital image file.

12. The system of claim 11, wherein the information carrier comprises a printed business card.

13. The system of claim 7, further comprising a digital interface coupled to the network and to the database and adapted to selectively provide the digital information file for transfer by download.

14. The system of claim 13, wherein the digital interface is further adapted to selectively display the low resolution digital image file.

15. The system of claim 14, wherein the digital interface comprises a link to request an information carrier.

16. The system of claim 14, wherein the digital interface comprises an updating tool for selectively updating the raw information.

17. The system of claim 16, wherein the computer device is further adapted to update the high and low resolution digital image files and the digital information file from the updated raw information.

18. The system of claim 7, wherein the digital information locator comprises a uniform resource locator (URL) address.

19. The system of claim 7, wherein the digital information locator is machine-readable.

20. A method of managing information comprising:
processing information on a computer system by:
receiving raw information comprising data related to at least one of an individual, a business, a service or an object,
converting the raw information into a high resolution digital image file, a low resolution digital image file, and a digital information file, the low resolution digital image file and the digital information file having faster transfer speeds than the high resolution digital image file, and
storing the high and low resolution digital image files and the digital information file on a network-accessible device; and
managing the information after the processing by:
selectively creating an information carrier from the high resolution digital image file, the information carrier comprising a digital information locator, and
providing access to the low resolution digital image file and the digital information file on the network-accessible device through the digital information locator.

21. The method of claim 20, wherein providing access further comprises digitally displaying the low resolution digital image file and making the digital information file available for downloading.

22. The method of claim 20, wherein selectively creating further comprises printing a business card, the digital information locator comprising a printed network address.

23. The method of claim 22, further comprising generating the digital information locator from at least part of the raw information.

24. The method of claim 20, further comprising:
post-processing the information by:
selectively updating the raw information; and
updating the high and low resolution digital image files and the digital information file according to the updated raw information.

25. The method of claim 20, wherein the digital information locator is machine-readable.

26. A method of providing information management tools comprising:

receiving raw contact information for printing on an information carrier;
entering the raw contact information into a computer for use by a printing system;
selectively creating first, second and third digital files from the raw contact information, the first digital file having a larger file size than the second digital file;
storing the first, second and third digital files in a network accessible location;
printing an information carrier by the printing system from the first digital file, the information carrier including a printed network address related to the network accessible location;
providing selective visual access to the second digital file at the network accessible location, the second digital file comprising a digital representation of the information carrier; and
providing selective access to the third digital file for downloading comprising the raw contact information at the network accessible location.

27. A method of providing contact information, the method comprising:
receiving a raw data set comprising entity contact information;
processing the raw data set to create a first high-resolution digital data file, a second low-resolution digital data file and a third digital information file, the first digital data file being larger than the second digital data file, and storing the first, second and third digital files in a database;
printing a carrier from the first digital data file to include the entity contact information and a digital information locator after processing of the raw data set is completed; and
providing access to the second and third digital files via the digital information locator.

28. The method of claim 27, wherein printing the carrier comprises printing a business card, wherein generating a third digital data file comprises generating an electronic business card file, and wherein providing access to the second and third digital data files comprises displaying a visual representation of the business card from the second digital data file and providing access to the electronic business card file to download the entity contact information.

29. The method of claim 27, wherein the digital information locator is machine-readable.

30. The method of claim 27, wherein the digital information locator comprises a network address.

31. A method of managing information comprising:
receiving contact information by a network device;
processing the contact information by:
converting the contact information into a high resolution digital image file, a low resolution digital image file, and a digital information file, wherein the high resolution digital image file and the low resolution digital image file include the same depiction of the contact information and the low resolution digital image file has a smaller file size than the high resolution digital image file, and
storing the high and low resolution digital image files and the digital information file on a network-accessible device;
creating an information carrier from the high resolution digital image file, the information carrier comprising a digital information locator; and
providing access to at least one of the low resolution digital image file and the digital information file on the network-accessible device via the digital information locator, wherein providing access to the low resolution digital image file comprises providing a visual representation of the information carrier, and wherein providing access to the digital information file comprises making at least a portion of the contact information in the digital information file available for downloading.

32. A method comprising:
in a processing stage:
receiving, by a network device, information related to at least one of an individual, a business, a service or an object, and
storing the information in a high resolution digital file, a low resolution digital file and a digital information file in a database coupled to the network, the high resolution digital file having a larger file size than that of the low resolution digital file or the digital information file;
in a post-processing stage:
creating an information carrier from the high resolution digital file, and
linking a digital locator created on the information carrier with a network address related to the stored information; and
in a distribution stage:
disseminating the information carrier, and
accessing at least a portion of the stored information via the digital locator, wherein accessing the low resolution digital file comprises viewing a representation of the information carrier, and wherein accessing the digital information file comprises accessing at least a portion of the information.

33. The method of claim 32, wherein the distribution stage further comprises downloading at least a portion of the stored information in the digital information file.

34. The method of claim 32, wherein creating an information carrier comprises printing an information carrier comprising the digital locator.

35. The method of claim 32, wherein the digital locator comprises one of a machine-readable barcode or a universal resource locator (URL).

36. The method of claim 32, wherein the distribution stage further comprises requiring a log in before the accessing.

37. The method of claim 32, wherein the distribution stage further comprises presenting an advertisement.

38. The method of claim 32, wherein the distribution stage further comprises presenting a link via which information carriers can be ordered.

39. The method of claim 32, wherein the distribution stage further comprises accepting contact information from a user doing the accessing.

40. The method of claim 39, wherein the distribution stage further comprises notifying the user according to the contact information if the stored information is edited.

41. The method of claim 39, wherein the distribution stage further comprises contacting, by an entity related to the stored information, the user according to the contact information.

42. The method of claim 39, wherein the distribution stage further comprises conducting data mining relating to at least one of the accessing or the accepting.

* * * * *

UNITED STATES PATENT AND TRADEMARK OFFICE
CERTIFICATE OF CORRECTION

PATENT NO. : 8,166,011 B2  
APPLICATION NO. : 11/242603  
DATED : April 24, 2012  
INVENTOR(S) : Curry

Page 1 of 1

It is certified that error appears in the above-identified patent and that said Letters Patent is hereby corrected as shown below:

On the title page item (56) under Foreign Patent Documents

| | | | |
|---|---|---|---|
| Insert | --WO-02/25403 | 03-28-2002 | Brown et al. -- |
| | -- WO-02/46967 | 06-13-2002 | Dutcher et al. -- |
| | -- WO-01/80580 | 10-25-2001 | Song et al. -- |
| | -- JP-2001-344362 | 12-14-2001 | Naoya -- |

Signed and Sealed this  
Twenty-fifth Day of August, 2015

Michelle K. Lee  
*Director of the United States Patent and Trademark Office*